(12) United States Patent
Fritz

(10) Patent No.: US 6,910,682 B2
(45) Date of Patent: Jun. 28, 2005

(54) PNEUMATIC-SPRING WHEEL-SUSPENSION LEG

(75) Inventor: Michael Fritz, Herdecke (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/338,942

(22) Filed: Jan. 8, 2003

(65) Prior Publication Data
US 2003/0127781 A1 Jul. 10, 2003

(30) Foreign Application Priority Data
Jan. 10, 2002 (DE) ......... 102 00 632

(51) Int. Cl.[7] ............ F16F 13/00; B60G 11/32
(52) U.S. Cl. .................. 267/64.25; 267/35
(58) Field of Search ........ 188/315; 267/64.11, 267/64.21, 64.24, 64.25, 64.28, 33, 34, 35

(56) References Cited

U.S. PATENT DOCUMENTS

| | | | |
|---|---|---|---|
| 4,613,116 A | * 9/1986 | Buma | 267/64.25 |
| 5,058,868 A | * 10/1991 | Sirven | 267/259 |
| 5,941,508 A | * 8/1999 | Murata et al. | 267/64.17 |
| 6,322,058 B1 | * 11/2001 | Tanigawa et al. | 267/64.15 |
| 6,343,781 B1 | * 2/2002 | Joseph | 267/64.11 |

* cited by examiner

Primary Examiner—Christopher P. Schwartz
(74) Attorney, Agent, or Firm—Max Fogiel

(57) ABSTRACT

A pneumatic-spring wheel-suspension leg for motor vehicles. The leg comprises a bellows (1) that can be rolled up over a jacket (3) and accommodates a pneumatics chamber (9), a hydraulic dashpot inside the bellows or jacket, and a piston rod (5) that travels into and out of the dashpot and is attached axially and resiliently directly or indirectly at one end to the vehicle's chassis. The object is to relieve the dashpot of difficult attenuation tasks when a hard wheel suspension is necessary. The leg accordingly includes another pneumatics chamber (10) and the communication between the two pneumatics chambers can be partly or entirely blocked by a valve.

22 Claims, 2 Drawing Sheets

PNEUMATIC-SPRING WHEEL-SUSPENSION LEG

BACKGROUND OF THE INVENTION

The present invention concerns a pneumatic-spring wheel-suspension leg. Such legs are particularly employed in smoothly suspended vehicles. A device of this genus is disclosed in German 19 819 642 A2. The "spring" is essentially a bellows with connections and attachments at one end and accommodating a hydraulic oscillating dashpot. One end of the dashpot extends out of the bellows and is also provided with connections and attachments.

To adapt its performance curve or degree of attenuation to the vehicle's operation in terms of road conditions, speed, and other parameters, the dashpot is provided with controls. Controls are especially necessary when the road is very rough, powerfully kicking the wheels out. To ensure satisfactory adhesion of the wheels to the road accordingly, the suspension's performance curve must be as hard as possible. In pneumatically sprung vehicles in particular, which must have as soft a suspension as possible, this means that the dashpot must have as wide a range of controls as possible on the other hand, which can lead to complicated designs with a density of controls. The object of the present invention is a pneumatically sprung wheel-suspension leg of the aforesaid genus that can be relieved of difficult attenuation tasks when a hard wheel suspension is necessary.

SUMMARY OF THE INVENTION

The advantages of the present invention are that the spring's performance curve can also be varied between soft and hard, whereby the curve switches automatically to hard when the wheel kicks out considerably toward the vehicle's body and to soft once the wheel has mostly stopped executing such long-wave motions.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
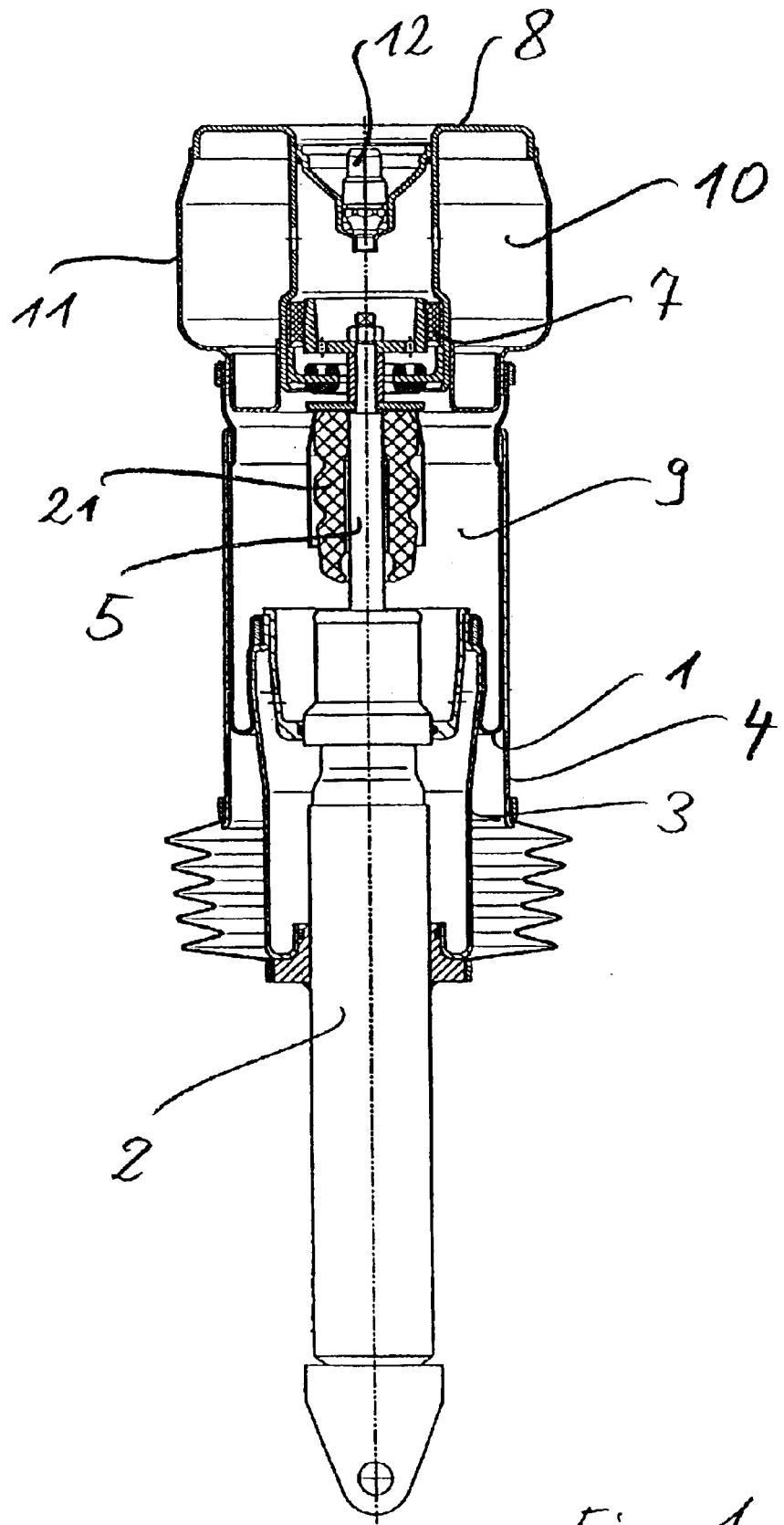
FIG. 1 is a longitudinal section through a pneumatic-spring wheel-suspension leg and FIG. 2 a larger-scale depiction of the top portion of FIG. 1.

Pneumatic-spring wheel-suspension legs preferably include a pneumatic spring that accommodates a hydraulic dashpot. As will be evident from FIG. 1, the spring essentially comprises a bellows 1 hermetically sealed off at one end from a pneumatic cylinder 2 and at the other from a fastener that attaches the spring to a vehicle's chassis. The end of bellows 1 adjacent to the dashpot extends inward by way of a roll-off jacket 3 and outward by way of a cylindrical holder 4. The dashpot consists of a cylinder 2 and of a piston rod 5 that travels into and out of it. At the end of the rod is a suspension bell 6 that is connected on the outside and preferably axially resilient to a supporting cylinder 8 by way of a rocker 7. Bell-supporting cylinder 8 is appropriately attached to an unillustrated location on the chassis.

Essentially above rod-suspension bell 6, bellows 1 accommodates two pneumatics chambers 9 and 10. Chamber 10 is invariable in volume and is essentially supported by cylinder 8. It extends into and out of the supporting cylinder and is surrounded by a solid jacket 11. Chambers 9 and 10 are charged with gas through a valve 12 inside bell-supporting cylinder 8.

Figure 2:
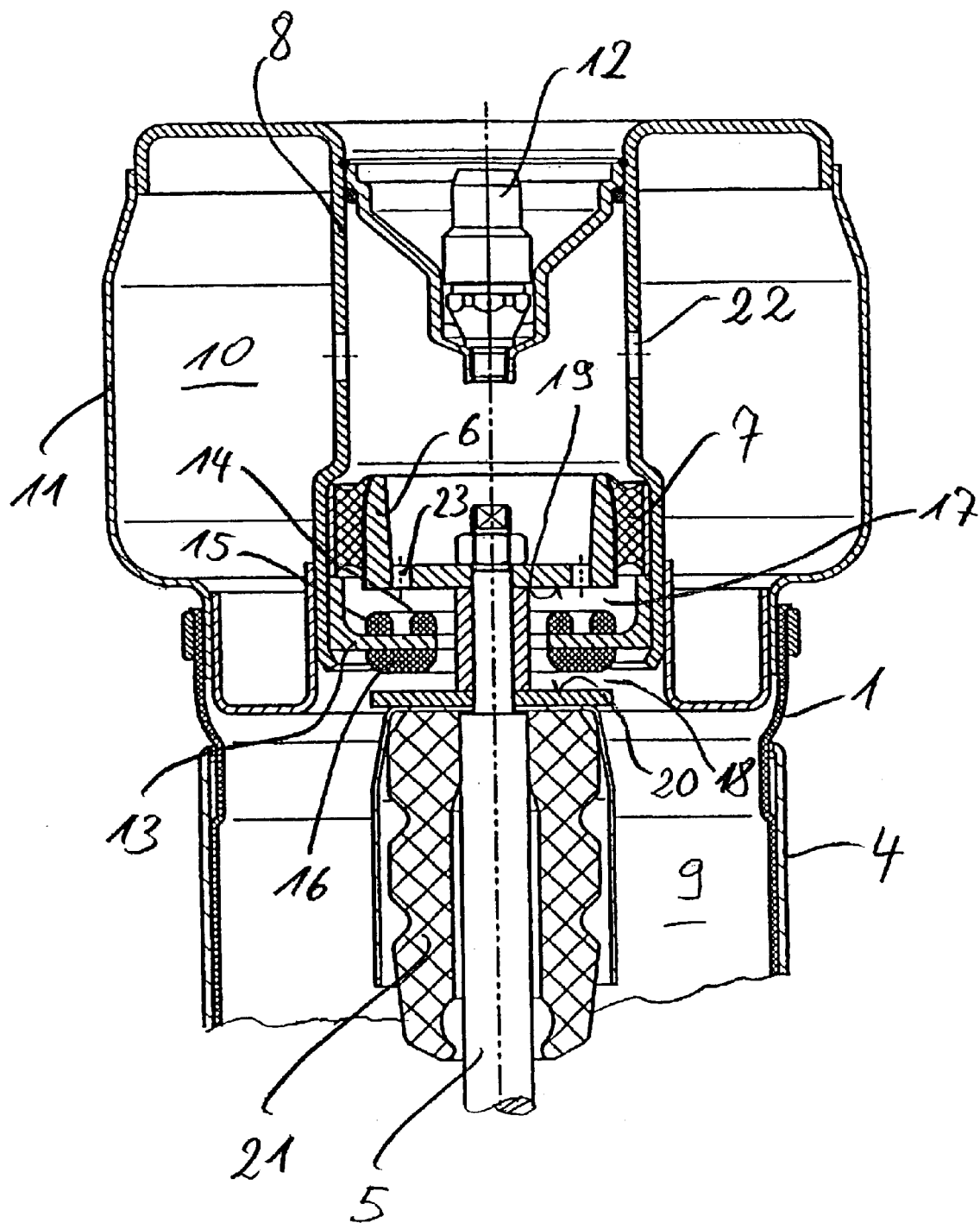

Pneumatics chambers 9 and 10 can be partly or entirely blocked off from each other by a particular valve, depicted in larger scale in FIG. 2. This valve includes a gasket 13, fastened in the illustrated example directly to bell-supporting cylinder 8 and hence indirectly to the vehicle's chassis. The valve is provided with sealing ridges on each surface. The ridges in the present example are in the form of resilient lips 14, 15, and 16 arrayed in a circle. The upper lips, 14 and 15, demarcate an annular gap. Contact surfaces 19 and 20 are provided at specific distances 17 and 18 from lips 14, 15, and 16. These contact surfaces are fastened to the end of the piston rod. The upper contact surface, 19, is represented by the base of rod-suspension bell 6. The lower contact surface, 20, is a disk resting at the end of piston rod 5 above a compression-limiter buffer 21.

With the pneumatic-spring leg out of operation, the valve will remain in the state represented in FIG. 2. Distances 17 and 18 are approximately equal. The valve communicates with pneumatics chamber 10 by way of bores 22 and 23 extending through bell supporting cylinder 8 and rod-suspension bell 6. The two chambers can accordingly freely exchange fluid as long as the leg is out of operation.

Due to the axially resilient suspension of piston rod 5 from rocker 7, the rod, and with it contact surfaces 19 and 20, will move either up or down depending on how powerfully piston rod 5 is resting against bell-supporting cylinder 8 and hence against the chassis. Simultaneously, depending on the direction of force, one of distances 17 and 18 will decrease until a lip 14, 15, or 16 comes to rest against a contact surface 19 or 20, closing the associated valve. In this situation only pneumatics chamber 9 will still be acting as a spring, and the performance curve will be hard. The hardness will ensure reliable roadway contact.

Once the wide relative motion between the wheel and the chassis ceases, the channel between pneumatics chambers 9 and 10 will be more or less opened again.

Lips 14, 15, and 16 can vary in shape. They can, as illustrated, be in the form of beads or be provided with ridges. They can also exclusively or in supplement to other components act as compression or tension limiters. They can be varied in shape to establish a performance curve. Alternatively however, compression limiter buffer 21 can also be involved in controlling the valve by, as it comes into contact with the dashpot, supporting the decrease in distance 18.

The action of the valve can also be varied by varying the shape and/or hardness of rocker 7. This component can be of a resilient material. It can even be a metal spring, a cup spring for instance. Combinations are also possible.

The pneumatics chambers and valve can also differ in form and position. The valve in particular can be kinematically reversed, with gasket 13 fastened to piston rod 5. In this event of course, contact surfaces 19 and 20 will be fastened to the vehicle's chassis.

List of Parts 1. bellows
2. cylinder
3. roll-off jacket
4. cylindrical holder
5. piston rod
6. rod-suspension bell
7. rocker 8. bell-supporting cylinder
9. pneumatics chamber
10. pneumatics chamber
11. jacket
12. valve
13. gasket
14. seal-creating edge (lip)
15. seal-creating edge (lip)
16. seal-creating edge (lip)
17. distance
18. distance
19. contact surface
20. contact surface
21. compression-limiter buffer
22. communicating bore
23. communicating bore

What is claimed is:

1. A pneumatic-spring wheel-suspension leg for motor vehicles having a chassis, comprising: a bellows rollable up over a jacket and having a first pneumatic chamber; a hydraulic dashpot inside said bellows; a piston rod traveling oscillatingly into and out of said dashpot and attached axially and resiliently at one end to the chassis of a vehicle; a second pneumatic chamber; and valve means for blocking at least partly communication between said first and second pneumatic chambers, said valve means being actuated by said piston rod dependent on a supporting force of said piston rod against a structure of a motor vehicle, said actuation of said valve means having minimum structure for switching between the two pneumatic chambers and closing one of said pneumatic chambers; said valve means closing by an amount dependent only on the magnitude of the supporting force of said piston rod against said structure of the motor vehicle through connection means between said supporting force of said piston rod against said structure of said motor vehicle and opening of a connection between said two pneumatic chambers and thereby influencing the connection between said two pneumatic chambers by the opening of said valve means.

2. A pneumatic-spring wheel-suspension leg as defined in claim 1, wherein said valve means is closable substantially dependent on how forcefully said piston rod rests against said chassis.

3. A pneumatic-spring wheel-suspension leg as defined in claim 2, wherein said valve means remains entirely open for as long as said piston rod is not exerting a force against said chassis.

4. A pneumatic-spring wheel-suspension leg as defined in claim 2, wherein said valve means remains closed for as long as said piston rod exerts a specific force against said chassis when traveling in either direction.

5. A pneumatic-spring wheel-suspension leg as defined in claim 1, wherein said first pneumatic chamber is substantially below an end of said piston rod and said second pneumatic chamber is substantially above said end of said piston rod.

6. A pneumatic-spring wheel-suspension leg as defined in claim 1, wherein said valve means is controlled in accordance with relative motion between said piston rod and said chassis.

7. A pneumatic-spring wheel-suspension leg as defined in claim 1, wherein said second pneumatic chamber has a constant volume of fluid.

8. A pneumatic-spring wheel-suspension leg for motor vehicles having a chassis, comprising: a bellows rollable up over a jacket and having a first pneumatic chamber; a hydraulic dashpot inside said bellows; a piston rod traveling oscillatingly into and out of said dashpot and attached axially and resiliently at one end to the chassis of a vehicle; a second pneumatic chamber; and valve means for blocking at least partly communication between said first and second pneumatic chambers, actuation of said valve means being dependent on a supporting force of said piston rod against a structure of a motor vehicle, said actuation of said valve means being free of requiring additional external means for actuation and having minimum structure for switching between the two pneumatic chambers and closing one of said pneumatic chambers; said valve means closing by an amount dependent on the supporting force of said piston rod against said structure of the motor vehicle; said value means having a gasket with edges on each side for producing a seal with elevated contact surfaces located at specific distances therefrom.

9. A pneumatic-spring wheel-suspension leg as defined in claim 8, wherein said gasket is fastened to said chassis and said contact surfaces are fastened to said piston rod.

10. A pneumatic-spring wheel-suspension leg as defined in claim 8, wherein said gasket is fastened to said piston rod and said contact surfaces are fastened to said chassis.

11. A pneumatic-spring wheel-suspension leg as defined in claim 8, wherein said edges on said gasket are mechanical compression and tension limiters.

12. A pneumatic-spring wheel-suspension leg as defined in claim 8, wherein a distance between one of said edges on said gasket and a contact one of said contact surfaces is decreased by a compression-limiter buffer when said dashpot rests against said buffer.

13. A pneumatic-spring wheel-suspension spring wheel-suspension leg for motor vehicles having a chassis, comprising: a bellows rollable up over a jacket and having a first pneumatic chamber; a hydraulic dashpot inside said bellows; a piston rod traveling oscillatingly into and out of said dashpot and attached axially and resiliently at one end to the chassis of a vehicle; a second pneumatic chamber; and valve means for blocking at least partly communication between said first and second pneumatic chambers, said first pneumatic chamber being substantially below an end of said piston rod and said second pneumatic chamber being substantially above said end of said piston rod; said value means having a gasket with edges on each side for producing a seal with elevated contact surfaces located at specific distances therefrom.

14. A pneumatic-spring wheel-suspension leg as defined in claim 13, wherein said edges on said gasket are resilient.

15. A pneumatic-spring wheel-suspension leg as defined in claim 14, wherein said resilient edges are rubber lips.

16. A pneumatic-spring wheel-suspension leg as defined in claim 14, wherein said resilient edges are plastic lips.

17. A pneumatic-spring wheel-suspension leg as defined in claim 13, wherein said gasket is fastened to said chassis and said contact surfaces are fastened to said piston rod.

18. A pneumatic-spring wheel-suspension leg as defined in claim 13, wherein said gasket is fastened to said piston rod and said contact surfaces are fastened to said chassis.

19. A pneumatic-spring wheel-suspension leg as defined in claim 13, wherein said edges on said gasket are mechanical compression and tension limiters.

20. A pneumatic-spring wheel-suspension leg as defined in claim 13, wherein a distance between one of said edges on said gasket and a contact one of said contact surfaces is decreased by a compression-limiter buffer when said dashpot rests against said buffer.

21. A pneumatic-spring wheel-suspension leg for motor vehicles having a chassis, comprising: a bellows rollable up over a jacket and having a first pneumatic chamber; a hydraulic dashpot inside said bellows; a piston rod traveling oscillatingly into and out of said dashpot and attached axially and resiliently at one end to the chassis of a vehicle; a second pneumatic chamber; and valve means for blocking at least partly communication between said first and second pneumatic chambers; actuation of said valve means being dependent on a supporting force of said piston rod against a structure of a motor vehicle, said actuation of said valve means being free of requiring additional external means for actuation and having minimum structure for switching between the two pneumatic chambers and closing one of said pneumatic chambers; said valve means closing by an amount dependent on the supporting force of said piston rod against said structure of the motor vehicle; said valve means being closeable substantially dependent on how forcefully said piston rod rests against said chassis; said valve means remaining entirely open for as long as said piston rod is not exerting a force against said chassis; said valve means remaining closed for as long as said piston rod exerts a specific force against said chassis when traveling in either direction; said valve means being controlled in accordance with relative motion between said piston rod and said chassis; said first pneumatic chamber being substantially below an end of said piston rod and said second pneumatic chamber being substantially above said end of said piston rod; said second pneumatic chamber having a constant value of fluid; said valve means having a gasket with edges on each side for producing a seal with elevated contact surfaces located at specific distances therefrom; said gasket being fastened to said chassis and said contact surfaces being fastened to said piston rod; said edges on said gasket being resilient; said resilient edges being rubber lips; said edges on said gasket being mechanical compression and tension limiters, a distance between one of said edges on said gasket and a contact one of said contact surfaces being decreased by a compression-limiter buffer when said dashpot rests against said buffer.

22. A pneumatic-spring wheel-suspension leg for motor vehicles having a chassis, comprising: a bellows rollable up over a jacket and having a first pneumatic chamber; a hydraulic dashpot inside said bellows; a piston rod traveling oscillatingly into and out of said dashpot and attached axially and resiliently at one end to the chassis of a vehicle; a second pneumatic chamber; and valve means for blocking at least partly communication between said first and second pneumatic chambers, said first pneumatic chamber being substantially below an end of said piston rod and said second pneumatic chamber being substantially above said end of said piston rod; said valve means being actuated by said piston rod dependent on a supporting force of said piston rod against a structure of the motor vehicle; said valve means closing by an amount dependent only on the magnitude of the supporting force of said piston rod against said structure of the motor vehicle.

* * * * *